(12) United States Patent
Man et al.

(10) Patent No.: US 10,499,770 B2
(45) Date of Patent: *Dec. 10, 2019

(54) ELECTRIC FRYER

(71) Applicants:Ningbo BIYI Electric Appliance Co., LTD, Yuyao, Zhejiang (CN); Team International Group of America Inc., Miami Gardens, FL (US)

(72) Inventors: Kaimong Man, Hong Kong (CN); Uri Murad, Aventura, FL (US)

(*) Notice: Subject to any disclaimer, the term of this patent is extended or adjusted under 35 U.S.C. 154(b) by 336 days.

This patent is subject to a terminal disclaimer.

(21) Appl. No.: 15/712,229

(22) Filed: Sep. 22, 2017

(65) Prior Publication Data
US 2018/0008096 A1 Jan. 11, 2018

Related U.S. Application Data

(63) Continuation of application No. 15/444,166, filed on Feb. 27, 2017, now Pat. No. 9,770,132, and a
(Continued)

(30) Foreign Application Priority Data

Mar. 9, 2016 (CN) .......................... 2016 1 0132549

(51) Int. Cl.
*A47J 37/12* (2006.01)
(52) U.S. Cl.
CPC ....... *A47J 37/1266* (2013.01); *A47J 37/1204* (2013.01); *A47J 37/1223* (2013.01); *A47J 37/1295* (2013.01)
(58) Field of Classification Search
CPC ................ A47J 37/1266; A47J 37/1223; A47J 37/1285; A47J 37/1209; A47J 37/1295; A47J 37/1219; A47J 37/1228; A47J 37/1242; A47J 31/061; A47J 27/0817; A47J 27/14; A47J 36/00; A47J 36/14; A47J 43/18
(Continued)

(56) References Cited

U.S. PATENT DOCUMENTS

| 5,133,247 A * | 7/1992 | Pastrick ................ A47J 31/061 99/295 |
| 6,572,764 B2 * | 6/2003 | Mullaney, Jr. ...... A47J 37/1223 210/167.28 |

(Continued)

*Primary Examiner* — Ibrahime A Abraham
*Assistant Examiner* — Chris Q Liu
(74) *Attorney, Agent, or Firm* — Frank Marino

(57) ABSTRACT

An appliance for frying has a frying pot disposed within a housing for containing oil or fat and having a normally-closed valve disposed at a bottom thereof. An oil receiving tank is removably receivable within the housing below the frying pot, and has an oil receiving hole positionable below the draining valve such that when the valve is opened, the or fat may flow from the frying pot into the oil receiving tank. An actuation mechanism disposed entirely on the housing has a first condition wherein the activation mechanism allows removal of the oil receiving tank relative to the housing, a second condition wherein the activation mechanism prevents removal of the oil receiving tank relative to the housing while not opening the valve, and a third condition wherein the activation mechanism prevents removal of the oil receiving tank relative to the housing while opening the valve.

14 Claims, 9 Drawing Sheets

Related U.S. Application Data continuation-in-part of application No. 15/367,689, filed on Dec. 2, 2016, now abandoned.

(58) Field of Classification Search
USPC ......... 99/330, 403, 408, 336, 295, 299, 407, 99/325, 334, 342, 357, 413, 416, 418; 426/438, 417, 302, 509, 523
See application file for complete search history.

(56) References Cited

U.S. PATENT DOCUMENTS

| | | |
|---|---|---|
| 6,666,131 B2 | 12/2003 | Bizard |
| 7,314,001 B2 | 1/2008 | Beugnot et al. |
| D760,017 S | 6/2016 | Berge |
| 2003/0070557 A1 | 4/2003 | Bizard |
| 2004/0079238 A1* | 4/2004 | Beugnot ............. A47J 37/1285 99/330 |
| 2005/0034611 A1* | 2/2005 | McLemore ......... A47J 37/1209 99/413 |
| 2011/0117259 A1* | 5/2011 | Storek .................... A47J 36/14 426/509 |

\* cited by examiner

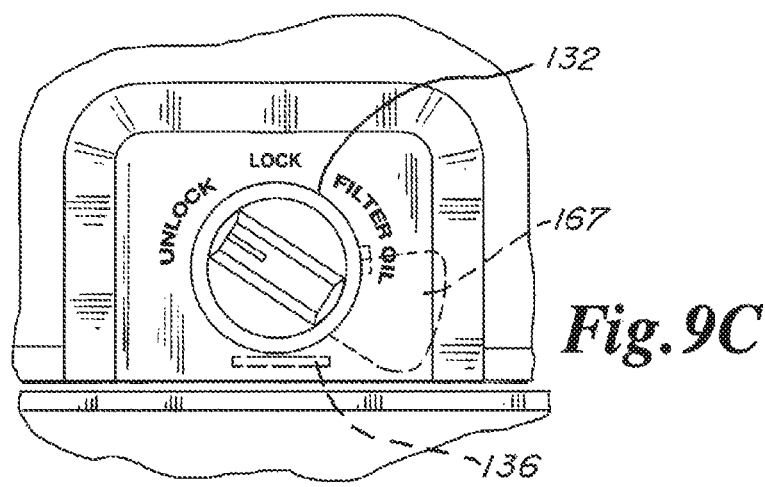
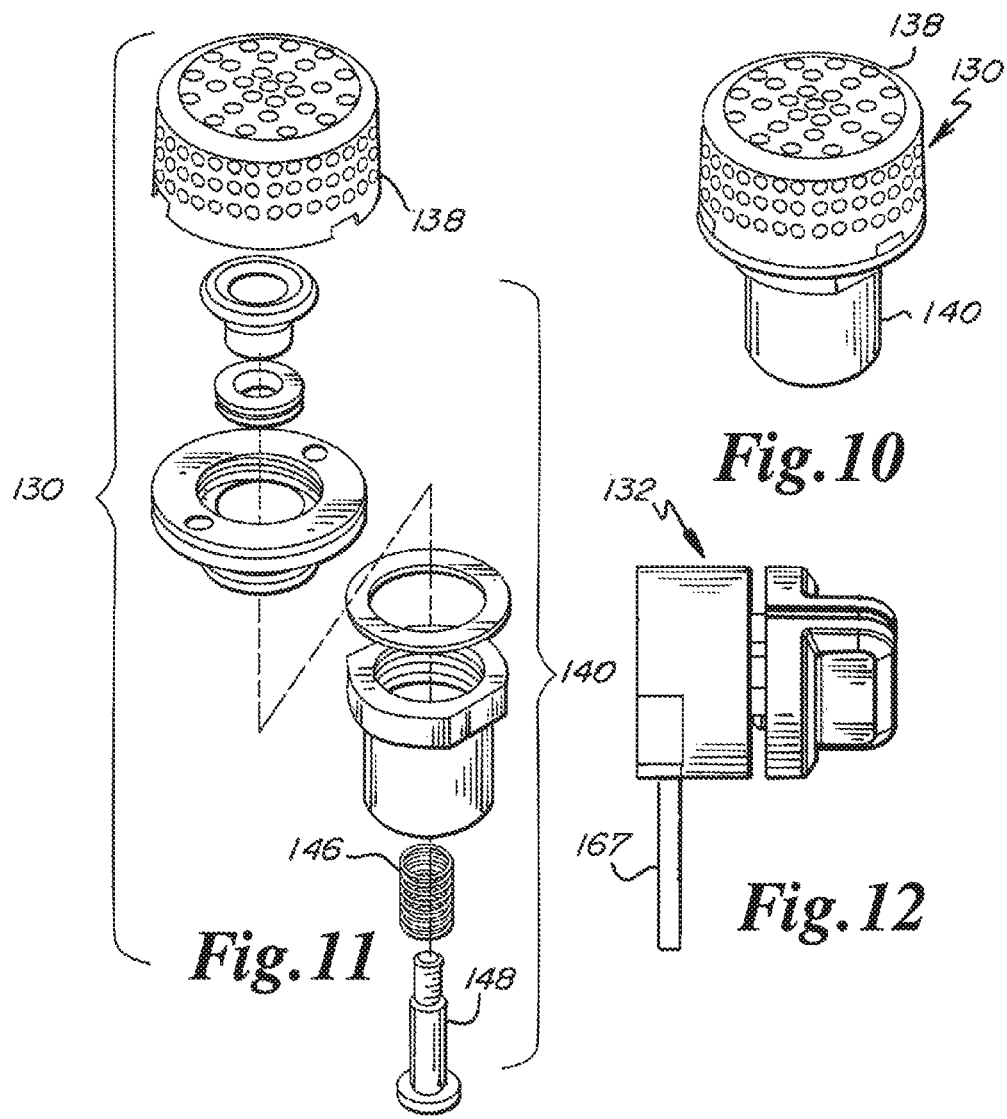

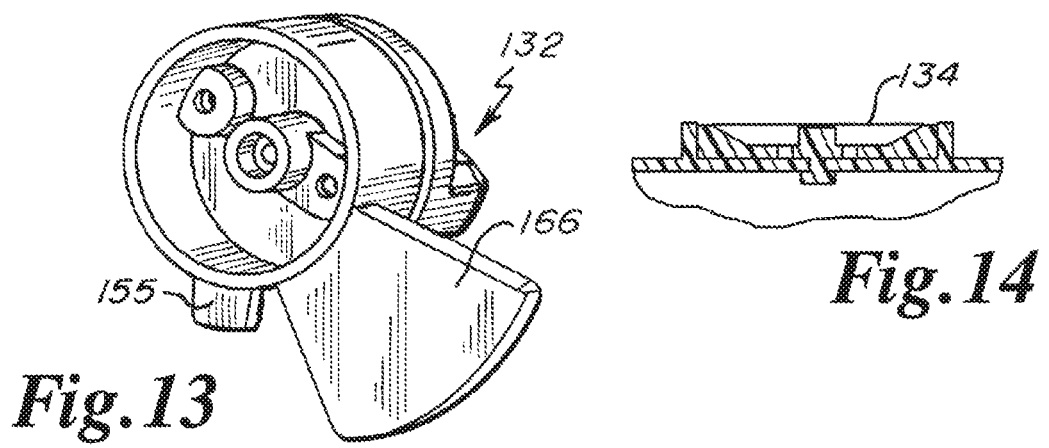
Fig.13
Fig.14
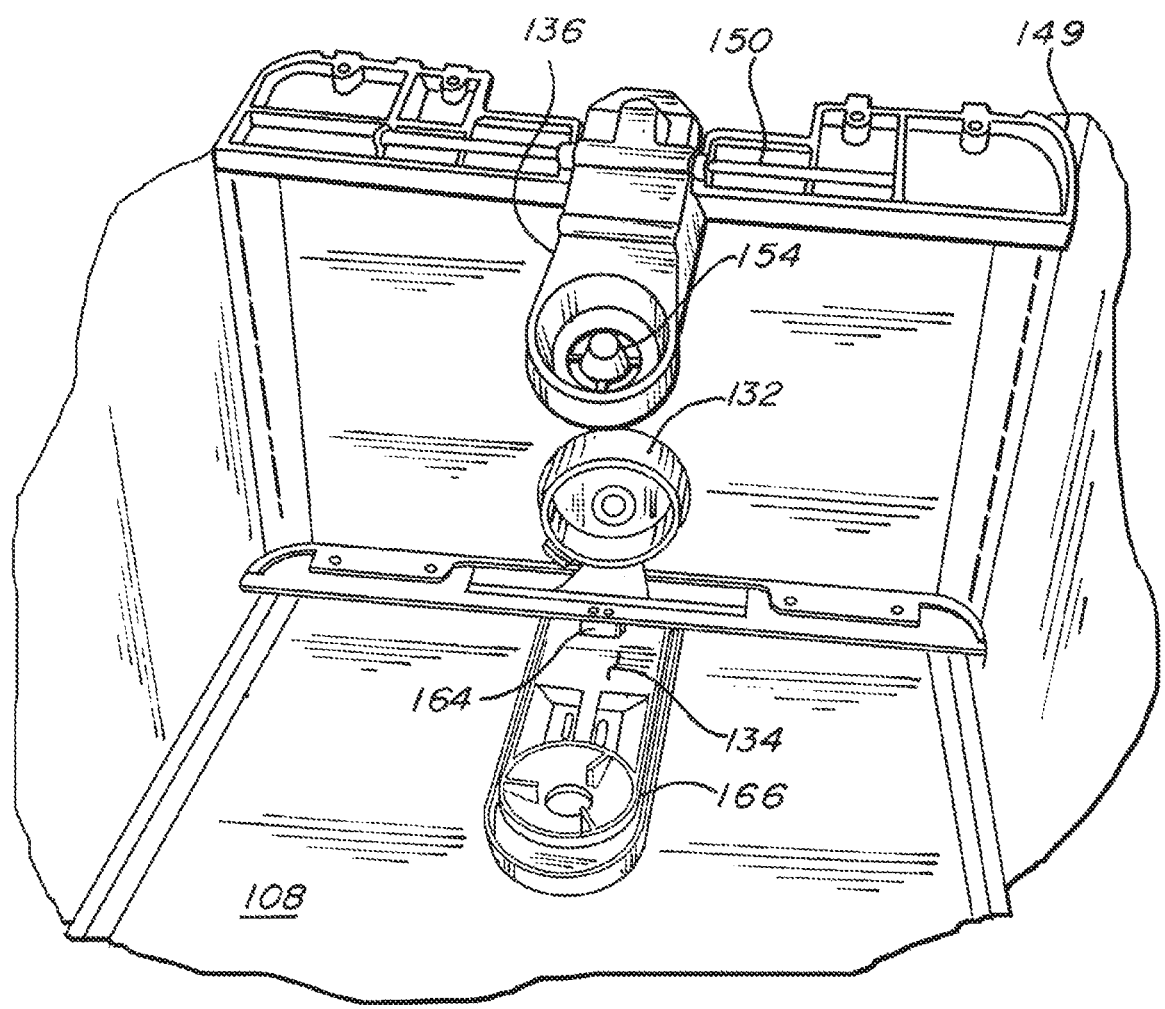
Fig.15

ELECTRIC FRYER

RELATED APPLICATIONS

This application is a Continuation of, and claims full priority to, pending U.S. Non-Provisional application Ser. No. 15/444,166, filed on Feb. 27, 2017, and is there-through a Continuation-in-Part of, and claims full priority to, U.S. Non-Provisional application Ser. No. 15/367,689, filed on Dec. 2, 2016, and Chinese Application Number 201610132549.5 filed on Mar. 9, 2016, and to all applications anywhere to which said applications are entitled to priority, the entire teachings all of which are incorporated herein by reference in their entireties.

FIELD OF THE INVENTION

The invention is related to the "deep fat" frying of food. More specifically, the invention is related to appliances and methods for such frying. In particular, the invention provides an improved means for maintaining clean and fresh cooking oil or "fat" in such appliances.

BACKGROUND

Appliances for deep fat frying are common and well known. Such appliances typically include a tank for holding the oil in which the food is to be fried (the "fat"), means for heating that oil to a temperature sufficiently high to fry the food when the food is immersed therein, and a basket or other form of food holding device for manipulating the food, such as immersing it into the oil to fry and removing it from the oil when frying is completed.

A common problem with such appliances is that the oil supply contained therein will quickly become contaminated with bits of food during frying, will become foul tasting and malodorous by the combination of such bits of food remaining therein and by prolonged periods at high temperatures, and by remaining non-refrigerated in the appliance for long periods between uses and thereby spoiling. So there is a need for a fryer that allows for the cleansing and refrigerated storage of the oil between uses.

Another problem common to deep fryers is that the oil is often used to cook foods that may cause allergic reactions in some persons, such as fish. So when if the fryer allows for such storage and reuse, caution needs to be used to avoid such reuse for those persons. So there is a need a fryer that allows for the storage and reuse of distinct vessels of such used oils; such as allergic and non-allergic.

U.S. Pat. Nos. 6,666,131 and 7,314,001, co-invented and co-owned by SEB S.A., teach a deep fryer having a removable emptying vessel into which used oil may be drained by a control mechanism that activates a drain valve of the cooking vessel. However, the control mechanism for activating the drain valve is disadvantageously mounted on the emptying vessel and so, if more than one vessel is used, such as described above, the mechanism must be repeated for each vessel, causing unneeded expense and complication. Further, because the mechanism is the most delicate part of the vessel and is exposed on the vessel when it is removed from the fryer, it is prone to damage.

In its later T-Fal FR8000 fryer, SEB S.A. apparently attempts to rectify that deficiency by moving most of the control mechanism to the fryer, but leaves a critical portion of the mechanism in a precarious valve-actuating member that extends from and is part of the emptying vessel. Additionally, because the mechanism is shared by two major and separable components whose relative disposition is difficult to precisely control, the reliability of the valve actuation is compromised. It is found that the valve actuation mechanism does not properly operate unless the emptying vessel is carefully moved into "just the right position".

There is a need for a fryer that employs one or more emptying and storing vessels in which the cost, complexity, and vulnerability of the vessel is minimized, and such is an object of the present invention. There is the need for such a fryer in which the valve operating mechanism is solely contained within the fryer and not reliant on the precise positioning of the vessel, and such is an object of the present invention. There is the need for such a fryer in which, when used with multiple vessels, redundant components are minimized, and such is an object of the present invention. Further advantages and objects of the present invention exist, which will be appreciated upon review of the included disclosure.

SUMMARY OF THE INVENTION

The invention may be embodied in or practiced using a deep fat frying appliance which includes means for filtering contaminants from the oil after cooking and means for transferring that filtered oil into a storage device which may be removed from the appliance and refrigerated, to thereby keep the oil fresh and reusable for a longer time and for more frequent re-uses.

The invention may be embodied in or practiced using an appliance for deep frying foodstuffs having a housing with a frying pot disposed therein for containing cooking oil or fat and having a normally-closed draining valve disposed at a bottom thereof. An oil receiving tank may be removably receivable within the housing below the frying pot, may have an oil receiving hole positionable below the draining valve such that when the draining valve is opened, the cooking oil or fat may flow from the frying pot into the oil receiving tank.

The appliance may have an actuation mechanism disposed entirely on the housing and having a first condition wherein the activation mechanism allows removal and replacement of the oil receiving tank relative to the housing, a second condition wherein the activation mechanism prevents removal and replacement of the oil receiving tank relative to the housing while not opening the draining valve, and a third condition wherein the activation mechanism prevents removal and replacement of the oil receiving tank relative to the housing while opening the draining valve.

The oil receiving tank may include a seal movable to either seal or unseal the oil receiving hole and engagable by the housing such that the oil receiving hole is sealed when the tank is removed from the housing and unsealed when the tank is received within the housing. The seal may be slidable co-directionally with the reception and removal of the oil receiving tank relative to the housing such that engagement of the seal with the housing causes the seal to slide between an unsealing and a sealing position.

The actuation mechanism may include a rotor having a user-operable knob portion and a valve actuator portion, wherein rotation of the knob portion between the second and third conditions causes the valve actuation portion to open and close the valve, respectively. The rotor may have a cam and the actuation mechanism may include a movable link, and rotation of the knob portion from the second condition to the third condition may cause the link to open the valve and rotation the knob portion from the third condition to the second condition may cause the link to close the valve. The link may be a spring-biased rocker pivotable in a "see-saw"

motion by engagement with the cam such that as the cam forces a proximal end of the rocker downwardly, a distal end of the rocker moves upwardly to force open the valve.

The rotor may include a blocking member, and rotation of the rotor from the first condition to either of the second or third conditions may cause the blocking member to prevent removal and replacement of the oil receiving tank relative to the housing.

The appliance may have a filter for removing particulate matter from the cooking oil or fat as the cooking oil or fat flows from the frying pot into the oil receiving tank. The filter may be disposed within the frying pot. The draining valve may include the filter. The filter may be removable from the appliance for cleaning or replacement.

The invention may alternatively be embodied in or practiced using an appliance for deep frying foodstuffs with a housing, a frying pot disposed within the housing for containing cooking oil or fat and having a normally-closed draining valve disposed at a bottom thereof, and a heating control removably engagable with the housing.

The heating control may have a heating element disposed within the frying pot when the heating control engages the housing to heat the cooking oil or fat, and a control for selectively energizing the heating element.

An oil receiving tank may be removably receivable within the housing below the frying pot, having an oil receiving hole positionable below the draining valve such that when the valve is opened, oil may flow from the frying pot into the oil receiving tank.

The appliance may have an actuation mechanism disposed entirely on the housing and with a first condition wherein the activation mechanism allows removal and replacement of the oil receiving tank relative to the housing, a second condition wherein the activation mechanism prevents removal and replacement of the oil receiving tank relative to the housing while not opening the valve, and a third condition wherein the activation mechanism prevents removal and replacement of the oil receiving tank relative to the housing while opening the valve.

The oil receiving tank may include a seal movable co-directionally with the reception and removal of the oil receiving tank relative to the housing to either seal or unseal the oil receiving hole and engagable by the housing such that the oil receiving hole is sealed when the tank is removed from the housing and unsealed when the tank is received within the housing. The actuation mechanism may include a rotor having a user-operable knob portion and a valve actuator portion, and rotation of the rotor between the second and third conditions may cause the valve actuation portion to open and close the valve, respectively. The rotor may have a cam.

The actuation mechanism may include a spring-biased rocker, and rotation of the rotor from the second condition to the third condition may cause the cam to force a proximal end of the rocker downwardly, a may cause a distal end of the rocker to move upwardly to force open the valve. The rotor may also include a blocking member, and rotation of the rotor from the first condition to either of the second or third conditions may cause the blocking member to prevent removal and replacement of the oil receiving tank relative to the housing.

The draining valve may include a filter for removing particulate matter from the cooking oil or fat as the cooking oil or fat flows from the frying pot into the oil receiving tank.

Further features and aspects of the invention are disclosed with more specificity in the Detailed Description and Drawings provided herein and showing exemplary embodiments of the invention.

BRIEF DESCRIPTION OF THE DRAWINGS

An exemplary embodiment of a deep fat fryer in accordance with or useful in practicing the invention are shown in the accompanying Drawings, of which;

FIG. 9C is a partial front view of the fryer of FIG. 1 in its unlocked configuration;

FIG. 10 is a perspective view of the filter/valve assembly of the fryer of FIG. 1;

FIG. 11 is an exploded view of the filter/valve assembly of the fryer of FIG. 1;

FIG. 12 is a side view of the seal activating mechanism of the fryer of FIG. 1;

FIG. 13 is a perspective view of the seal activating mechanism of FIG. 12;

FIG. 14 is a cross-sectional of the sliding seal of the fryer of FIG. 1 taken at Line 14-14 of FIG. 7B; and FIG. 15 is a partial exploded internal view of the fryer of FIG. 1.

DETAILED DESCRIPTION OF EXEMPLARY EMBODIMENTS

Figure 1:
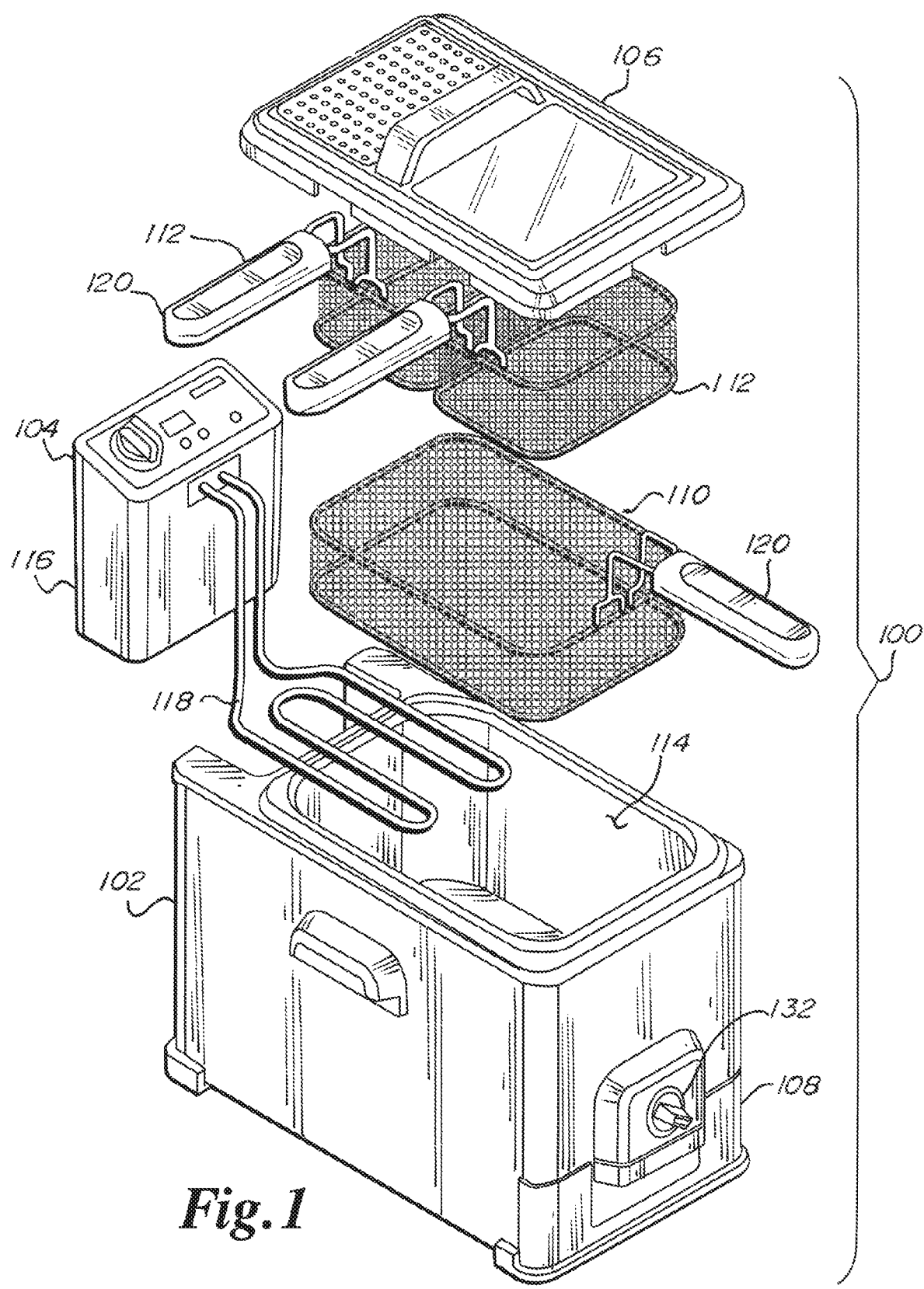
FIG. 1 is an exploded view of a deep fat fryer.

Referring to FIGS. 1 through 15, the invention may be embodied in or practiced using the depicted electrical deep frying appliance 100. The deep fryer includes a main housing 102, a heating control 104, a lid 106, a filtered oil tank 108, and food baskets. The food baskets include large basket 110 and two small baskets 112. The main housing includes a frying pot 114 that is intended to receive cooking oil. The heating control includes an electrical control box 116 and a tubular electric heating element 118. The control box includes a power cord (not shown) for connection to electrical power, and controls for programming and operating the heating element, cooking temperature, and timing.

Figure 3:
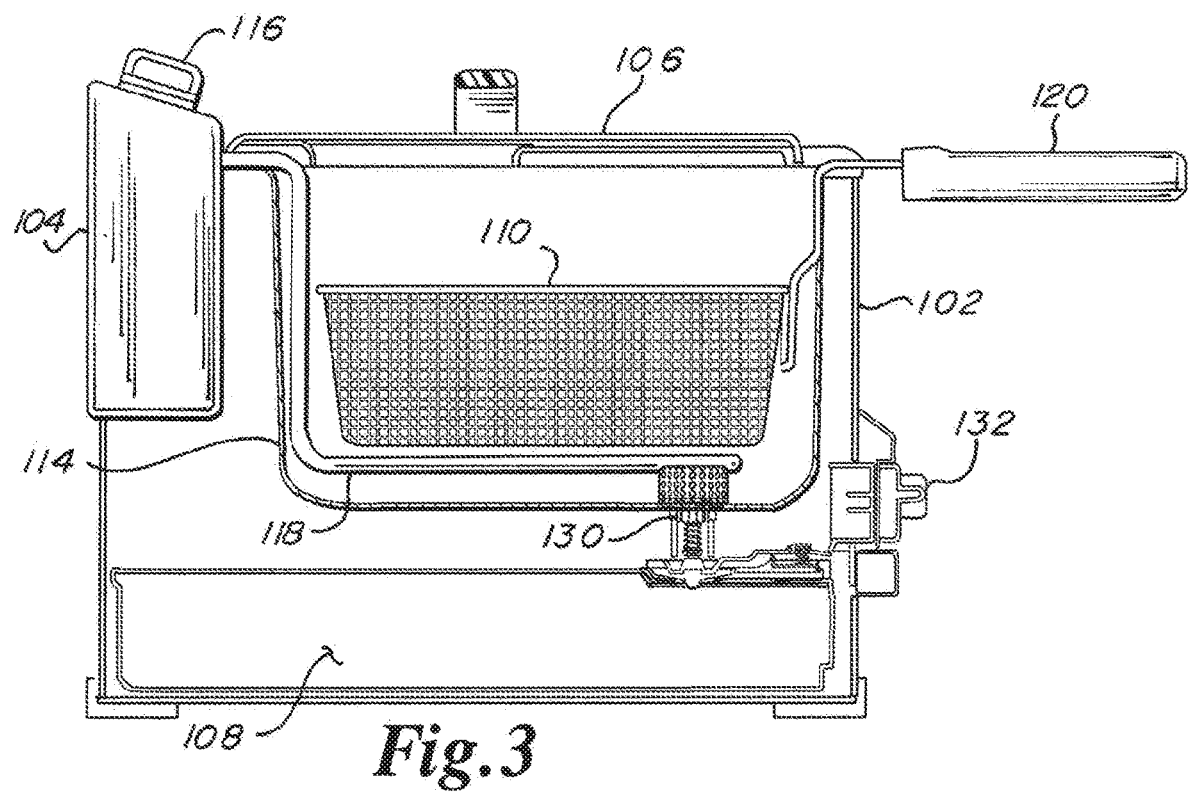
FIG. 3 is a full side cross sectional view through the fryer of FIG. 1.

The lid and heating control are removable from the main housing to simplify cleaning of these components individually and for other advantageous reasons. With the lid removed and the heating control properly engaged into the main housing, the heating element is disposed near the bottom of the frying pot. Cooking oil may then be poured into the cooking pot to a level high within the pot, as shown in FIG. 3. The heating element may then heat the cooking oil in the pot to a desired temperature according to the user's selection. A thermostatically-controlled display on the control box may indicate when the oil is at the proper frying temperature.

Figure 2:
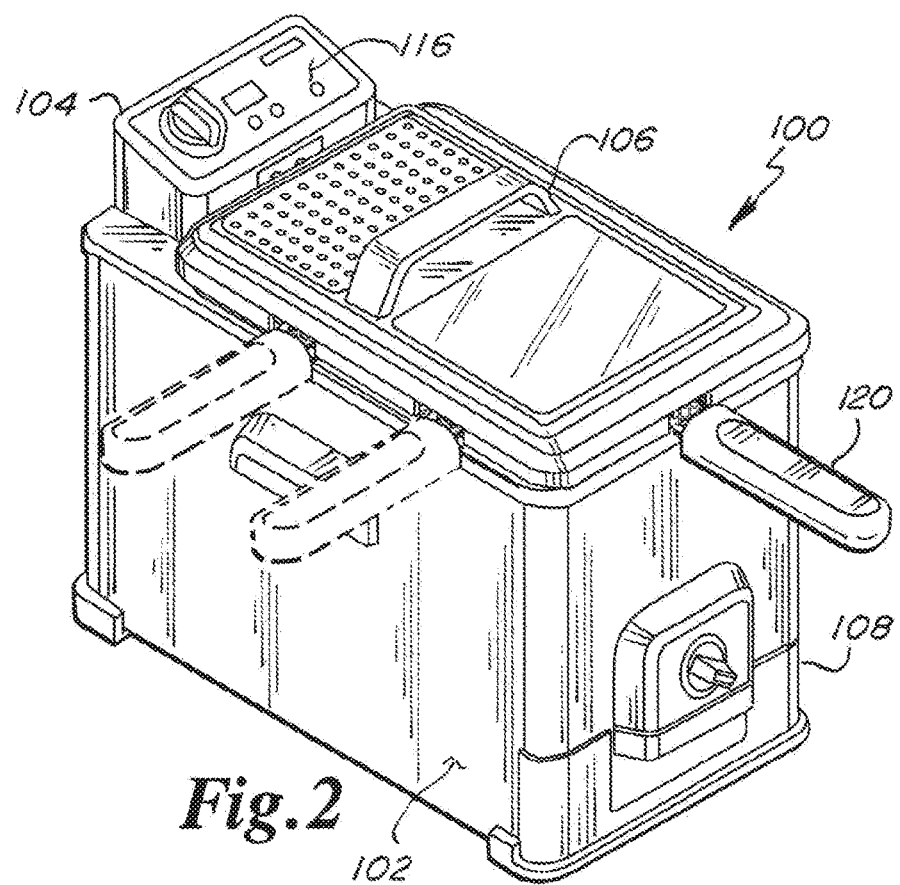
FIG. 2 is a perspective view of the fryer of FIG. 1.

The large basket, or one or both of the small baskets may then be loaded with food to be fried and lowered into the pot such that the food is immersed below the top surface of the heated cooking oil and is fried there-within. FIG. 2 shows the handles of small baskets in broken lines to demonstrate where they would be positioned when used.

The lid may or may not be replaced over the frying pot during frying. The basket's handle 120 rests on the upper perimeter of the housing to position and retain the food properly within the oil, and extends from the appliance for safety and convenience when manipulating the basket. A timer in the heating control may indicate, via the display, when the food has been sufficiently fried. The baskets are also configured to engage the housing in a position directly above the cooking pot, such as after frying is complete. The baskets are, of course, perforated to allow the oil to circulate through the basket and food during frying, and to allow the oil to drain from the basket back into the cooking pot when resting in the above position after frying. After the food has been served, the empty basket, lid, and heating control may be taken to the sink and washed.

The heating element is displaced from the bottom of the cooking pot during frying sufficiently to allow circulation of the oil as it is heated and to allow space for food crumbs and such to collect below as they inadvertently fall from frying food, so that they are not in contact with the heating element. Such contact will not only insulate the heating element from the oil, but will also promote burning and undesirable oil qualities. Cooking oil is relatively expensive, but may be re-used many times if not overheated, if kept clean, and if refrigerated between uses. But these crumbs and such are undesirable pollutants that can taint and otherwise shorten the life of the cooking oil. They impart bad flavors, colors, and odors into the oil, and they spoil much faster than the oil, even when refrigerated.

In typical prior art fryers, a user intent on saving the used oil for re-use would typically allow the oil to cool in the cooking post, then lift the appliance and pour the used oil through a funnel into a separate container for placement into a refrigerator. But of course, such pouring from a heavy appliance was prone to spillage and messy waste. The oil pouring from the appliance would initially be the clear oil at the top of the pot, but would eventually get cloudier and include more crumbs as it was poured. While the user might try to terminate the pouring as the crumbs begin to flow into the container, it was impossible to prevent the flow of some of the crumbs, and the crumbs remaining in the pot would include a significant amount of useful oil that would then be wasted.

To overcome this deficiency, the bottom of frying pot 114 is equipped with a novel filtering drain system that communicates directly and selectively with the removable filtered oil tank 108, as shown in FIGS. 3 thru 15.

The operation of the filtering drain system is depicted in FIGS. 8A through 9C, and the related components are shown in FIGS. 5 through 7C and 10 through 15. The components of the system include filter/valve assembly 130, actuation rotor 132, sliding seal 134, and spring-biased rocker 136. The filter/valve assembly includes filtering cap 138 and normally-closed spring-biased valve 140. Actuation rotor 132 and spring-biased rocker 136 together form a valve actuation mechanism. The portion of the actuation rotor outside of housing is a knob portion for access by the user, and the portion within the housing is a valve actuation portion for engaging and controlling the filter/valve assembly and spring-biased valve.

The filter valve assembly is affixed through a drain hole in the bottom of the frying pot. Porous filtering cap 138 is removable for cleaning or replacement. As shown, this cap is made of perforated formed stainless steel sheet, but it might otherwise be made of formed screen or any equivalent construction, provided that the openings there-through are large enough to allow the passing of oil but small enough to prevent the passing of most food particles. It is found that openings of approximately 1.5 to 2 MM perform adequately. The valve is biased closed by compression spring 146 so that valve stem 148 is normally forced downwardly to seal the drain hole.

Rocker 136 is pivotally affixed to support 149 of the main housing at hinge pin 150 and biased by compression spring 152 so that its valve-actuating post 154 at the rocker's distal end is normally positioned down below and not in contact with the valve stem (When used herein, the term "proximal" shall be meant to mean towards a user positioned at the front of the appliance, and the term "distal" shall be meant to mean the opposite). This leaves valve 140 in its normally closed condition. The proximal end of the rocker is selectively engagable by cam 155 of the actuation rotor so that when the rotor is rotated the cam causes the rocker to pivot in a "see-saw" motion against the bias of spring 152, such that the valve-actuating post moves upward against the valve pin, forcing the valve open. Reverse rotation of the rotor allows spring 152 to force the rocker's valve actuating post back down, thereby allowing spring 146 to force the valve closed.

Sliding seal 134 is slidingly affixed to filtered oil tank 108 and normally biased by two compression springs 160 so that the sliding seal covers over and seals filtered oil hole 162 of the tank. When the tank is pushed into the main housing, the sliding seal engages tab 164 of support 149 to force the sliding seal towards the proximal end of the tank, thereby aligning the sliding seal's funnel 166 with the filtered oil hole as the filtered oil hole becomes aligned under valve 140. Pulling the tank back out of the housing, when allowed to do so by the position of the actuating rotor (as later explained) allows the sliding seal to move back towards the distal end of the tank, under the influence of springs 160, to cover over and re-seal the filtered oil hole.

Actuation rotor 132 serves two functions;
1) it locks filtered oil tank 108 into main housing 102 to prevent its removal except under the proper circumstances , and 2) it actuates rocker 136 to actuate valve 140 under the proper circumstances.

Figure 4:
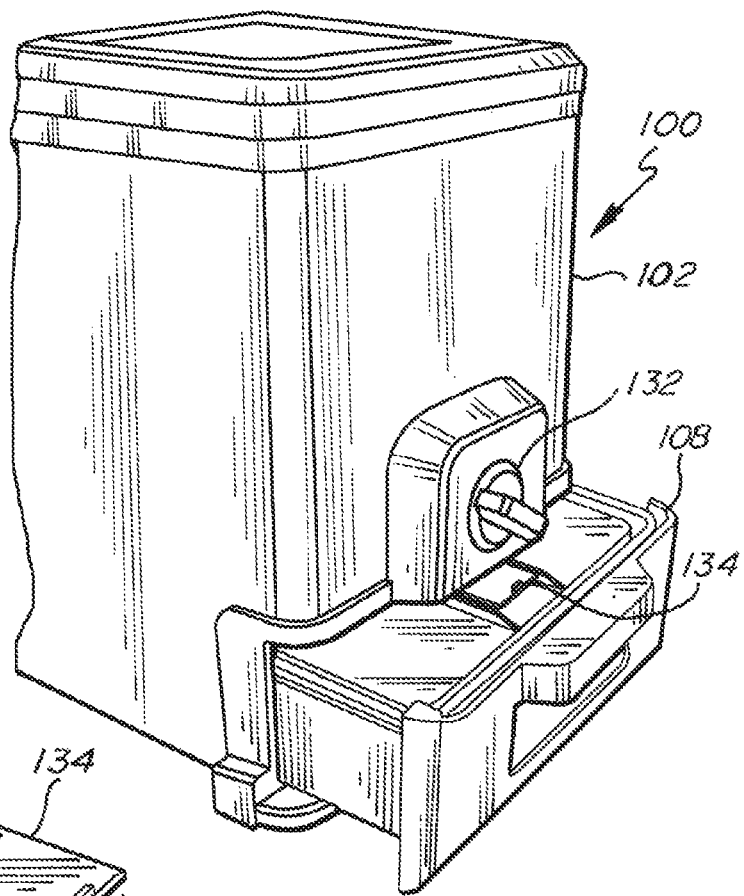
FIG. 4 is a partial perspective view of the fryer of FIG. 1 with is oil storage tank being removed.
Figure 5:
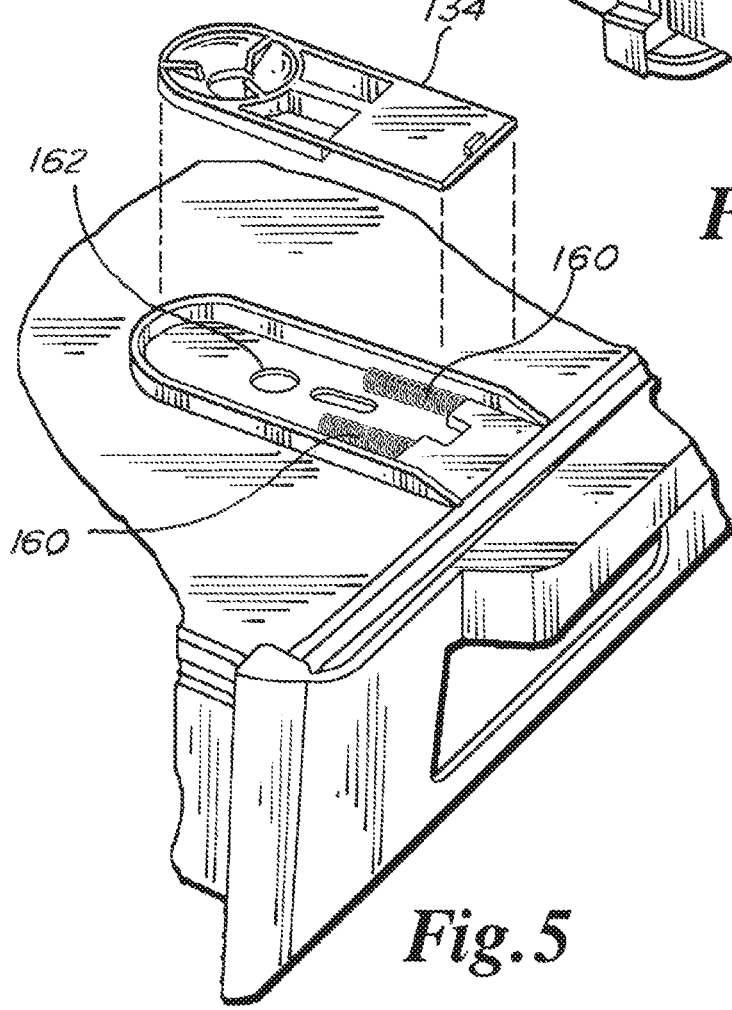
FIG. 5 is an exploded partial perspective view of the oil storage tank of the fryer of FIG. 1.
Figure 6A:
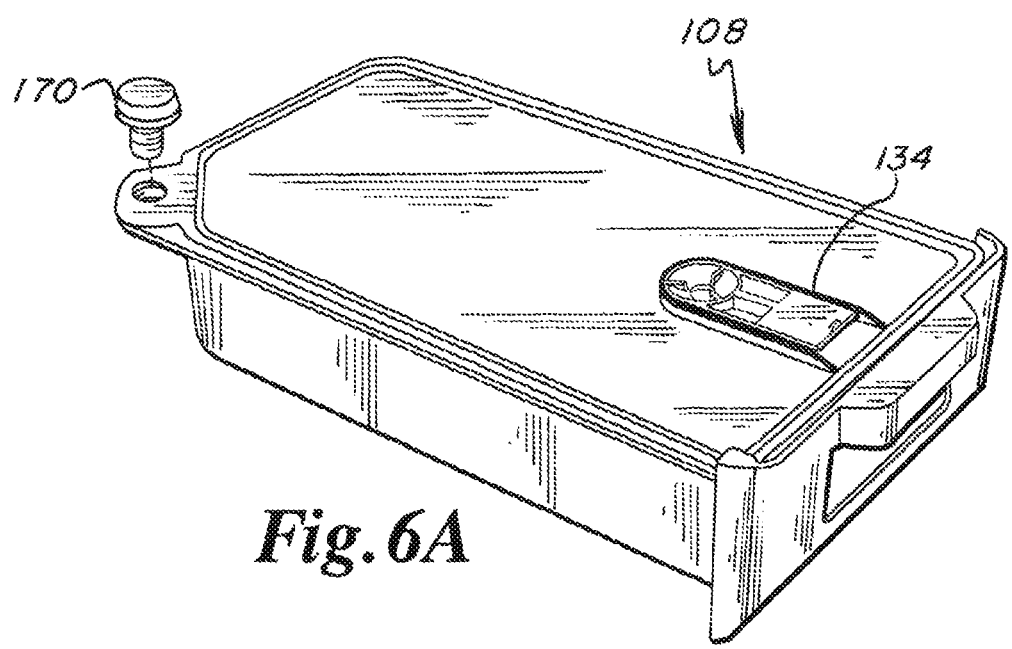
FIG. 6A is a perspective view of the assembled oil storage tank of FIG. 5 in its sealed configuration.
Figure 6B:
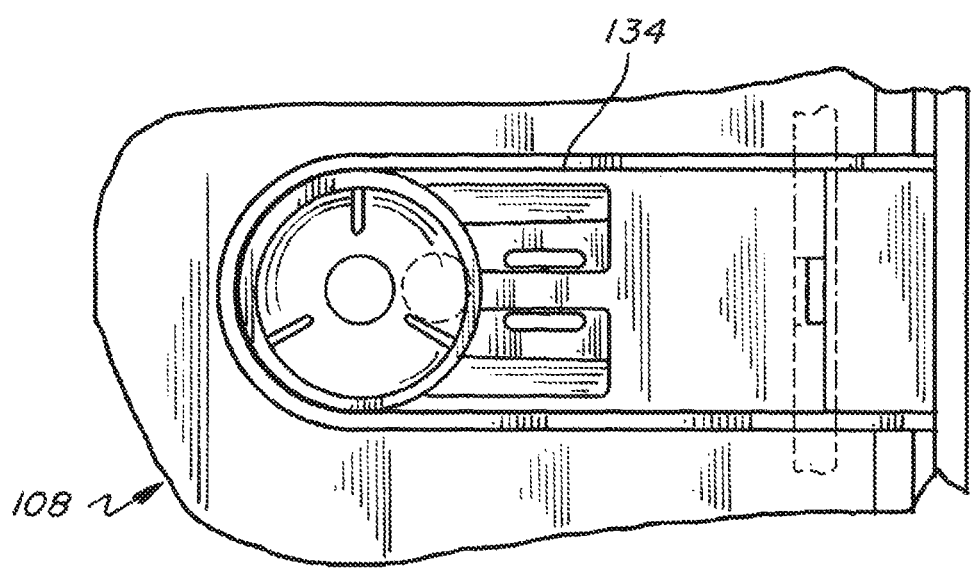
FIG. 6B is a partial top view of the sealing mechanism of the oil storage tank of FIG. 6A in its sealed configuration.
Figure 6C:
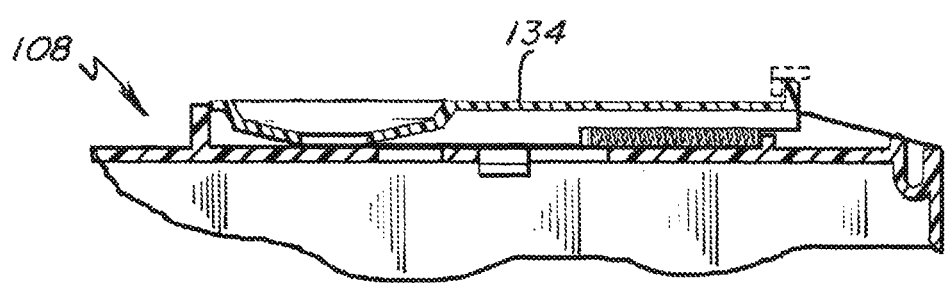
FIG. 6C is a partial cross sectional view of the sealing mechanism of FIG. 6B in its sealed configuration.
Figure 7A:
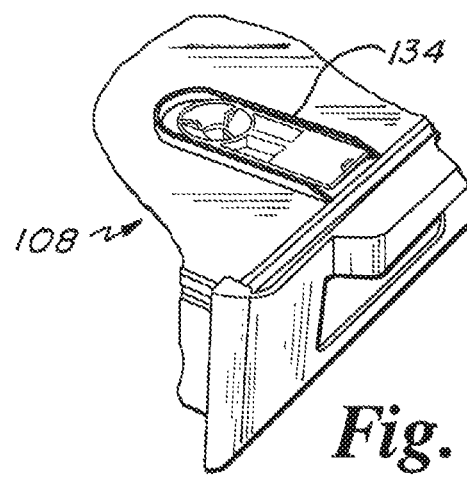
FIG. 7A is a partial perspective view of the assembled oil storage tank of FIG. 5 in its filtered oil receiving configuration.
Figure 7B:
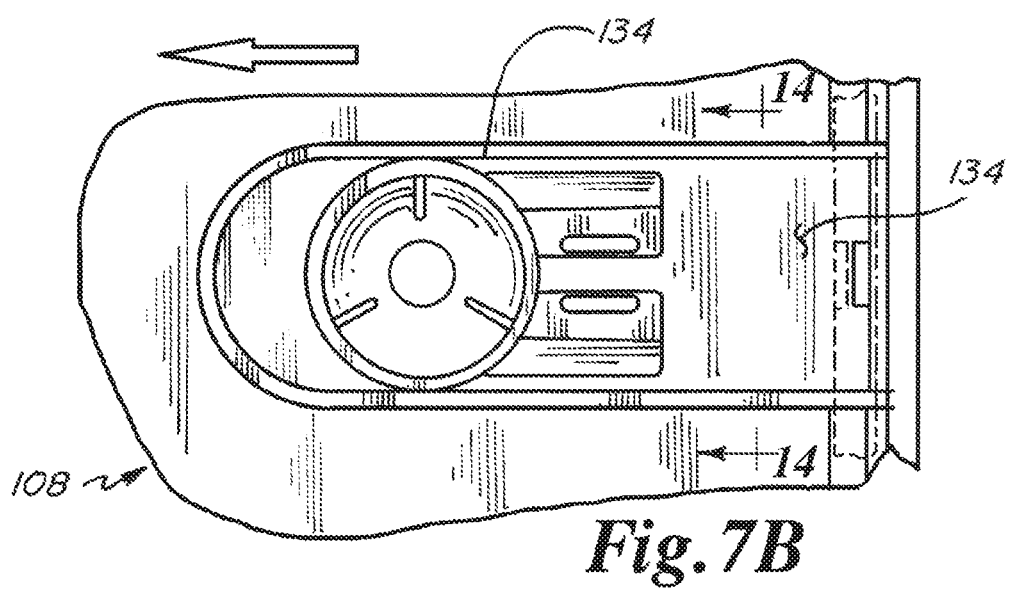
FIG. 7B is a partial top view of the sealing mechanism of the oil storage tank of FIG. 7A in its filtered oil receiving configuration.
Figure 7C:
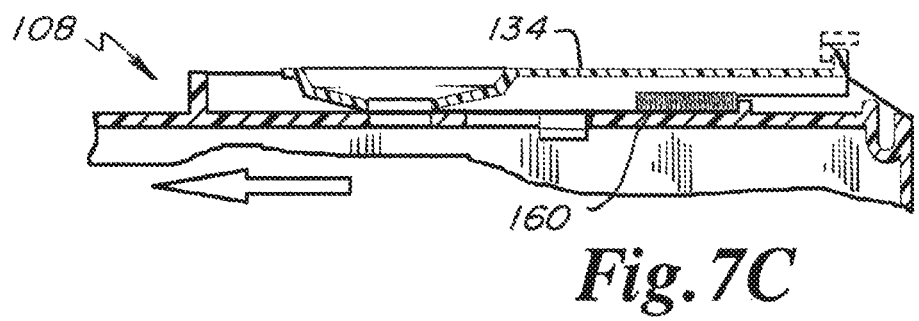
FIG. 7C is a partial cross sectional view of the sealing mechanism of FIG. 7B in its filtered oil receiving configuration.
Figure 8A:
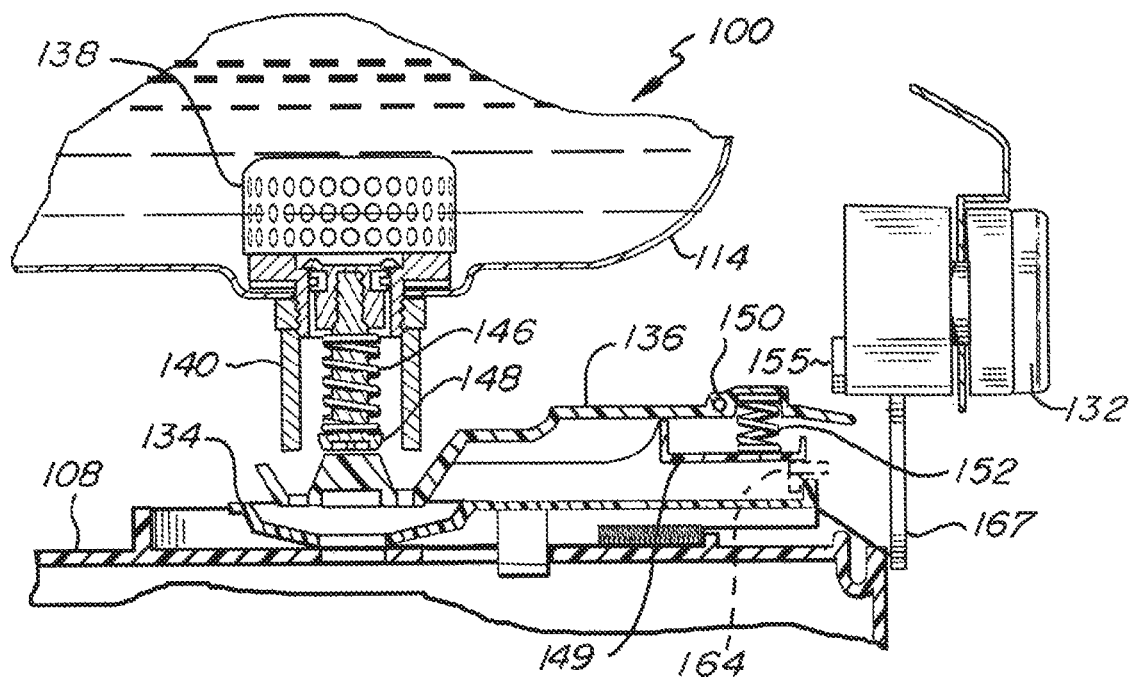
FIG. 8A is a partial cross sectional view through the seal activation system of the fryer of FIG. 1 in its locked configuration.
Figure 8B:
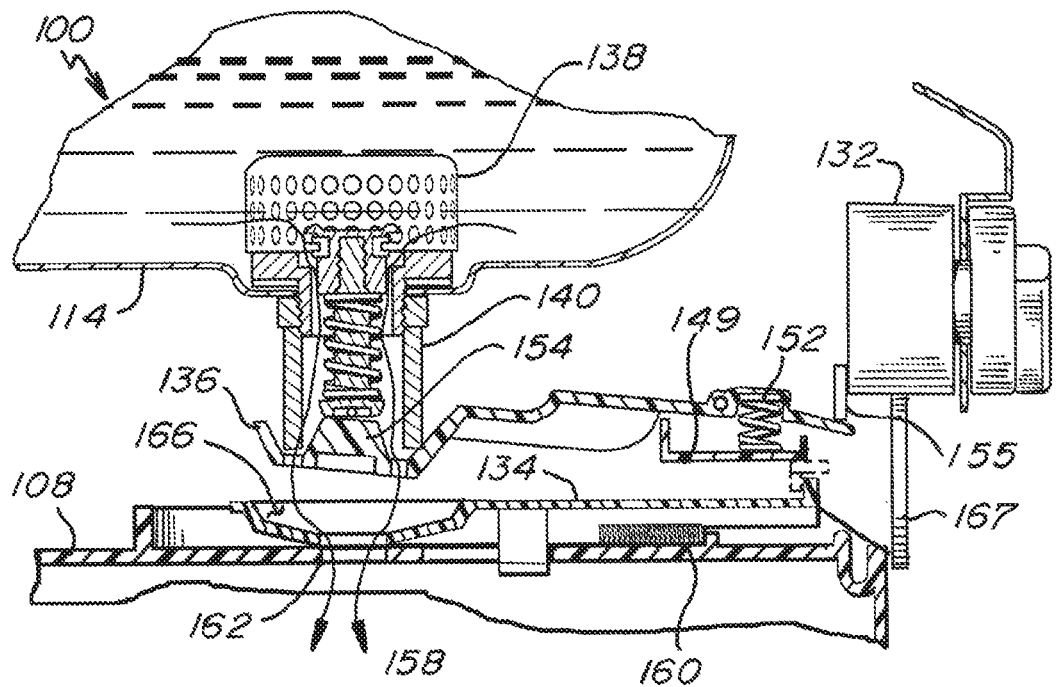
FIG. 8B is a partial cross sectional view through the seal activation system of the fryer of FIG. 1 in its oil filtering configuration.
Figure 8C:
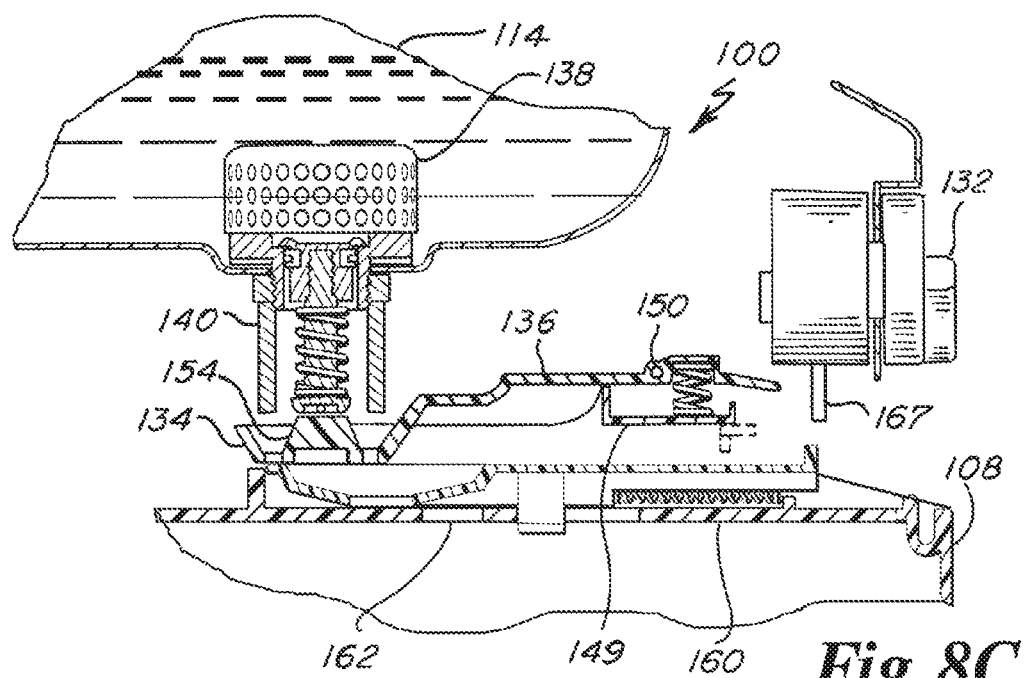
FIG. 8C is a partial cross sectional view through the seal activation system of the fryer of FIG. 1 in its unlocked configuration.
Figure 9A:
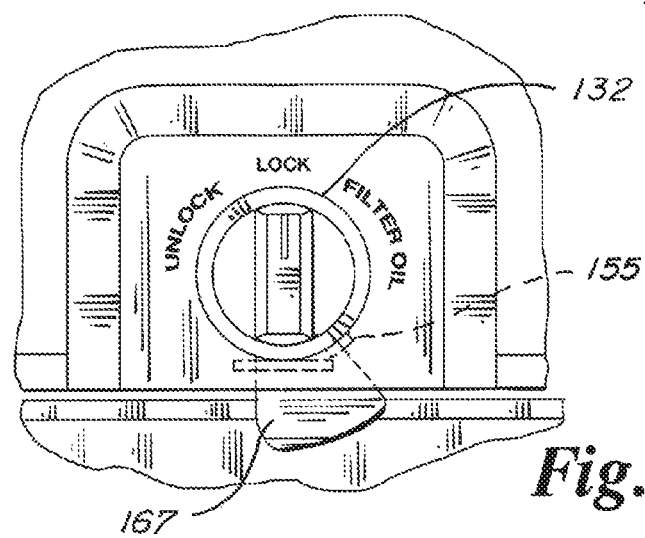
FIG. 9A is a partial front view of the fryer of FIG. 1 in its locked configuration.
Figure 9B:
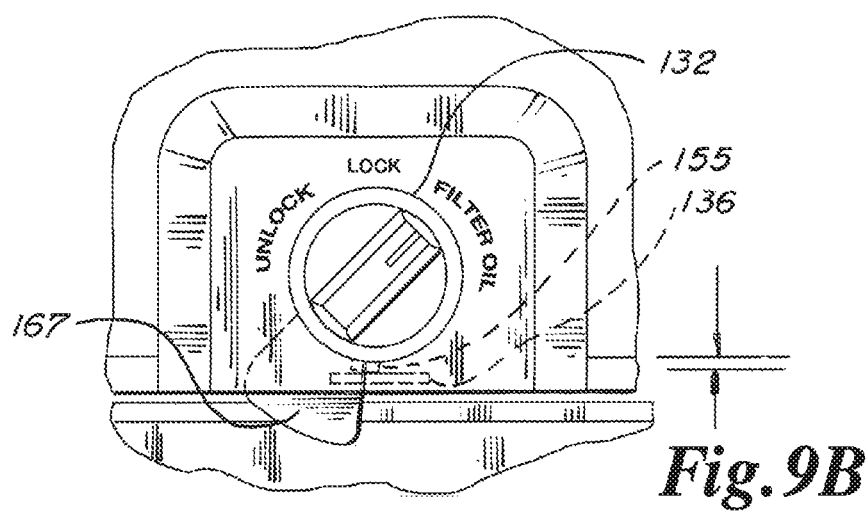
FIG. 9B is a partial front view of the fryer of FIG. 1 in its oil filtering configuration.

The filtered oil tank may be may slid into or from the housing when the actuation rotor is in its "Unlock" position, as demonstrated in FIGS. 4, 8C, and 9C. When the tank is properly positioned within the housing, as shown in FIGS. 2 and 3, the rotor may be rotted to its "Lock" position, as shown in FIGS. 8A and 9A, so that the rotor's blocking tab 166 rotates to block removal of the tank. In this "Lock" position the valve is not forced open by the rotor's cam 155 (best appreciated by viewing FIG. 8A), so oil 168 is retained in frying pot 114 and heating control 104 may be operated to perform frying, as described above.

After frying is complete, actuation rotor 132 may be rotated to its "Filter Oil" position, whereby cam 155 engages the proximal end of rocker 136 to cause the opening of valve 140, as described above, to thereby allow the used "dirty" oil 158 to flow from pot 114, through filter cap 138 (whereby it is converted to "clean oil" suitable for re-use), through opened valve 140, through funnel 166 and filtered oil hole 162, and into filtered oil tank 108. Note that blocking tab 166 continues to prevent removal of the tank during the "Filter Oil" arrangement.

Actuation rotor 132 may then be rotated to its "Unlock" position, as shown in FIGS. 8C and 9C, whereby blocking tab 166 is no longer blocking removal of the tank, and valve 140 is allowed to re-close, and the filtered oil tank, now filled with filtered "clean" oil, may be removed from housing 102 and stored in a refrigerator.

The filtered oil tank is also equipped with means to neatly pour the filtered oil back into the frying pot prior to the next frying event. Plug 170 normally seals a pouring hole (not shown) in a distal corner of the tank. When the plug is removed, the tank may be positioned over the frying pot and, because the pouring hole is adjacent a corner of the tank, oil may be poured from the tank without spillage or the need for a funnel.

While the heating element shown is an immersible electrical heating tube, and the heating control is removable from the housing, other common means for controlling and heating may alternatively be employed without departing from the invention. For instance, the invention could be equivalently practiced in a frying appliance having a heating element disposed under the frying pot and above the filtered oil tank. Or the heating of the oil could be accomplished by a gas-burning flame under the frying pot and above the filtered oil tank. Additionally, the controls could be equivalently arranged as a permanently affixed portion of the housing without departing from the scope of the invention.

Further, the rocker operation could be flipped over and the valve configuration could be such that the valve is opened when the valve stem is pulled down rather than pushed up, and the rocker could engage the valve stem and be caused by the cam to pull the valve stem down when the rotor is turned to the "Filter Oil" position.

So while the invention has been shown and described with reference to a specific exemplary embodiment, it should be understood by those skilled in the art that various changes in form and detail may be made without departing from the spirit and scope of the invention, and that the invention should therefore only be limited according to the following claims, including the broadest interpretation to which they are entitled.

We claim:

1. An appliance for deep frying foodstuffs and comprising:
    a housing;
    an open-topped frying pot disposed within and accessible through a top of the housing for containing cooking oil or fat and having a normally-closed draining valve disposed at a bottom thereof;
    an oil receiving tank removably receivable within and through a front of the housing below the frying pot, having an oil receiving hole positionable below the draining valve such that when the draining valve is opened, the cooking oil or fat may flow from the frying pot into the oil receiving tank; and
    an actuation mechanism on the front of the housing having;
    a first condition wherein the activation mechanism allows removal and replacement of the oil receiving tank relative to the housing with the draining valve closed;
    a second condition wherein the activation mechanism prevents removal and replacement of the oil receiving tank relative to the housing while not opening the draining valve; and
    a third condition wherein the activation mechanism prevents removal and replacement of the oil receiving tank relative to the housing while opening the draining valve;
    wherein the actuation mechanism comprises a rotor having a user-operable knob portion accessible at the front of the housing and a valve actuator portion, and wherein rotation of the knob portion between the second and third conditions causes the valve actuation portion to open and close the valve, respectively;
    wherein the rotor comprises a cam and the actuation mechanism further comprises a movable link, and wherein rotation of the knob portion from the second condition to the third condition causes the link to open the valve and rotation of the knob portion from the third condition to the second condition causes the link to close the valve;
    wherein the link is a spring-biased rocker pivotable in a see-saw motion by engagement with the cam such that as the cam forces a proximal end of the rocker downwardly, a distal end of the rocker moves upwardly to force open the valve;
    wherein the rotor further comprises a blocking member, and wherein rotation of the knob portion from the first condition to either of the second or third conditions causes the blocking member to prevent removal and replacement of the oil receiving tank relative to the housing;
    further comprising a filter for removing particulate matter from the cooking oil or fat as the cooking oil or fat flows from the frying pot into the oil receiving tank; and
    wherein the actuation mechanism is disposed entirely on the housing such that it remains on the housing when the oil receiving tank is removed there-from.

2. The appliance of claim 1 wherein the oil receiving tank comprises a seal movable to either seal or unseal the oil receiving hole and engagable by the housing such that the oil receiving hole is sealed when the tank is removed from the housing and unsealed when the tank is received within the housing.

3. The appliance of claim 2 wherein the seal is slidable co-directionally with the receipt and removal of the oil receiving tank relative to the housing such that engagement of the seal with the housing cause the seal to slide between an unsealing and a sealing position.

4. The appliance of claim 3 wherein the oil receiving tank comprises a seal movable to either seal or unseal the oil receiving hole and engagable by the housing such that the oil receiving hole is sealed when the tank is removed from the housing and unsealed when the tank is received within the housing.

5. The appliance of claim 4 wherein the seal is slidable co-directionally with the reception and removal of the oil receiving tank relative to the housing such that engagement of the seal with the housing cause the seal to slide between an unsealing and a sealing position.

6. The appliance of claim 5 further comprising a filter for removing particulate matter from the cooking oil or fat as the cooking oil or fat flows from the frying pot into the oil receiving tank.

7. The appliance of claim 6 wherein the filter is disposed within the frying pot.

8. The appliance of claim 7 wherein draining valve comprises the filter.

9. The appliance of claim 8 wherein the filter is removable from the appliance for cleaning or replacement.

10. The appliance of claim 4 wherein the rotor further comprises a blocking member, and wherein rotation of the knob portion from the first condition to either of the second or third conditions causes the blocking member to prevent removal and replacement of the oil receiving tank relative to the housing.

11. The appliance of claim 10 wherein the filter is within the frying pot.

12. The appliance of claim 11 wherein draining valve comprises the filter.

13. The appliance of claim 12 wherein the filter is removable from the appliance for cleaning or replacement.

14. An appliance for deep frying foodstuffs and comprising:
 a housing;
 an open-topped frying pot disposed within and accessible through a top of the housing for containing cooking oil or fat and having a normally-closed draining valve disposed at a bottom thereof;
 a heating control removably engagable with the housing and comprising;
  a heating element disposed within the frying pot when the heating control engages the housing to heat the cooking oil or fat; and
  a control for selectively energizing the heating element;
 an oil receiving tank removably receivable within and through a front of the housing below the frying pot, having an oil receiving hole positionable below the draining valve such that when the valve is opened, oil may flow from the frying pot into the oil receiving tank; and
 an actuation mechanism on the front of the housing having;
 a first condition wherein the activation mechanism allows removal and replacement of the oil receiving tank relative to the housing with the valve closed;
 a second condition wherein the activation mechanism prevents removal and replacement of the oil receiving tank relative to the housing while not opening the valve; and
 a third condition wherein the activation mechanism prevents removal and replacement of the oil receiving tank relative to the housing while opening the valve;
 wherein the oil receiving tank comprises a seal slidable co-directionally with the reception and removal of the oil receiving tank relative to the housing to either seal or unseal the oil receiving hole and engagable by the housing such that the oil receiving hole is sealed when the tank is removed from the housing and unsealed when the tank is received within the housing;
 wherein the actuation mechanism comprises a rotor comprising;
 a user-operable knob portion accessible at the front of the housing and a valve actuator portion, and wherein rotation of the knob portion between the second and third conditions causes the valve actuation portion to open and close the valve, respectively; and
 a cam;
 wherein the actuation mechanism further comprises a spring-biased rocker, and wherein rotation of the knob portion from the second condition to the third condition causes the cam to force a proximal end of the rocker downwardly, and causes a distal end of the rocker to move upwardly to force open the valve;
 wherein the rotor further comprises a blocking member, and wherein rotation of the knob portion from the first condition to either of the second or third conditions causes the blocking member to prevent removal and replacement of the oil receiving tank relative to the housing; and
 wherein the draining valve comprises a filter for removing particulate matter from the cooking oil or fat as the cooking oil or fat flows from the frying pot into the oil receiving tank; and wherein
 the actuation mechanism is disposed entirely on the housing such that it remains on the housing when the oil receiving tank is removed there-from.

* * * * *